(12) United States Patent
Liu et al.

(10) Patent No.: US 11,951,529 B2
(45) Date of Patent: Apr. 9, 2024

(54) CARTRIDGE-TYPE RIVET FEEDING MECHANISM OF FLOW DRILL SCREWING DEVICE

(71) Applicant: JEE TECHNOLOGY CO., LTD., Hefei (CN)

(72) Inventors: Lei Liu, Hefei (CN); Zhe Weng, Hefei (CN); Donghua Tang, Hefei (CN); Hongjie Liu, Hefei (CN)

(73) Assignee: JEE TECHNOLOGY CO., LTD., Hefei (CN)

( * ) Notice: Subject to any disclaimer, the term of this patent is extended or adjusted under 35 U.S.C. 154(b) by 262 days.

(21) Appl. No.: 17/678,846

(22) Filed: Feb. 23, 2022

(65) Prior Publication Data

US 2022/0176439 A1   Jun. 9, 2022

Related U.S. Application Data

(63) Continuation of application No. PCT/CN2019/129701, filed on Dec. 30, 2019.

(30) Foreign Application Priority Data

Aug. 27, 2019 (CN) .......................... 201910796573.2

(51) Int. Cl.
*B21J 15/32* (2006.01)

(52) U.S. Cl.
CPC ..................... *B21J 15/32* (2013.01)

(58) Field of Classification Search
CPC ....................................................... B21J 15/32
(Continued)

(56) References Cited

U.S. PATENT DOCUMENTS 5,379,508 A * 1/1995 Givler .................. B23B 39/16
29/524.1
2004/0217144 A1  11/2004 Matthews et al.
(Continued)

FOREIGN PATENT DOCUMENTS

CN    206254127 U    6/2017
CN    107150305 A    9/2017
(Continued)

OTHER PUBLICATIONS

First Office Action issued in counterpart Chinese Patent Application No. 201910796573.2, dated Jun. 30, 2020.
(Continued)

*Primary Examiner* — Praachi M Pathak
(74) *Attorney, Agent, or Firm* — Westbridge IP LLC

(57) ABSTRACT

Disclosed is a cartridge-type rivet feeding mechanism of a flow drill screwing device including a rivet box, a magazine for storing rivets from the rivet box, a rivet pulling mechanism including a rivet pulling block, a rivet pulling block guide housing and a linear driving unit connected with the rivet pulling block, a blowing mechanism including a curved connecting tube and a third air inlet, the rivet pulling block is defined with a T-shaped through hole capable of accommodating a rivet and configured for transferring the rivet from the first connecting tube to the second connecting tube. The first air inlet and the second air inlet are both configured for introducing compressed air to push the rivet to move towards the riveter head.

10 Claims, 5 Drawing Sheets

(58) Field of Classification Search
USPC .......................................................... 227/112
See application file for complete search history.

(56) References Cited

U.S. PATENT DOCUMENTS

| | | | |
|---|---|---|---|
| 2018/0154487 A1 | 6/2018 | Pfaffenrath et al. | |
| 2022/0176439 A1* | 6/2022 | Liu | ........................ B21J 15/027 |

FOREIGN PATENT DOCUMENTS

| | | |
|---|---|---|
| CN | 207171978 U | 4/2018 |
| CN | 207325868 U | 5/2018 |
| CN | 207551361 U | 6/2018 |
| CN | 208116671 U | 11/2018 |
| CN | 208409717 U | 1/2019 |
| CN | 208450505 U | 2/2019 |
| CN | 109692934 A | 4/2019 |
| CN | 208680434 U | 4/2019 |
| DE | 102005015032 A1 | 10/2006 |
| JP | H04327334 A | 11/1992 |
| JP | 2014233777 A | 12/2014 |
| WO | 2007031701 A1 | 3/2007 |

OTHER PUBLICATIONS

International Search Report and Written Opinion issued in corresponding PCT Application No. PCT/CN2019/129701, dated Apr. 28, 2020.

European Search Report issued in counterpart European Patent Application No. EP 19943502.5, dated Apr. 10, 2023.

* cited by examiner

US 11,951,529 B2

CARTRIDGE-TYPE RIVET FEEDING MECHANISM OF FLOW DRILL SCREWING DEVICE

CROSS-REFERENCE TO RELATED APPLICATIONS

The present application is a continuation application of International Application No. PCT/CN2019/1229701, filed on Dec. 30, 2019, which claims priority to Chinese Patent Application No. 201910796573.2, filed on Aug. 27, 2019. The disclosures of the aforementioned applications are incorporated for reference.

TECHNICAL FIELD

The present application relates to the field of the flow drill screwing process of the body in white welding workshops, in particular to a cartridge-type rivet feeding mechanism of a flow drill screwing device.

BACKGROUND

The flow drill screwing process is simplified as FDS, and is one of the common processes for connection of steel-aluminum vehicle bodies. In the flow drill screwing process, two plates need to be connected by rivets. When the flow drill screwing device is used for riveting, the rivets are stored in the rivet box, and then conveyed into the rivet feeding hose from the rivet box by compressed air, and moves rapidly in the rivet feeding hose to reach the riveter head, and are screwed into the plates needed to be connected through the riveter head.

In the related art, the rivets are initially stored in the rivet box of the device, after the device sends a riveting instruction, the rivet box sends the rivet to the rivet feeding hose, the rivet moves to the head of the riveter through the rivet feeding hose, and the riveter uses the rivet to connect the two plates.

The related art has the following defects in riveting: 1) when the riveting is carried out according to the related art, three seconds are spent for the riveter to receive the rivet after the device sends the riveting signal, thus the production is seriously slowed; 2) the riveting feeding hose is moved together with the riveter, causing the rivet feeding hose prone to be bent, and resulting in poor riveting feeding, the manual maintenance cost and the device recovery cost are increased; and 3) a large amount of airflow is needed when the rivet box feeds rivets, and a large amount of airflow is also needed during riveting of the riveter head, thus instantaneous air pressure drops are obvious, affecting the rivet feeding of the rivet box and the production.

SUMMARY

In order to overcome the defects in the prior art, the application aims to provide a cartridge-type rivet feeding mechanism of a flow drill screwing device to realize rapid and smooth rivet conveying from a rivet box to a riveter head of the flow drill screwing device.

The technical solution of the present application to solve the technical problem is as follows:

The present application provides a cartridge-type rivet feeding mechanism of a flow drill screwing device. The cartridge-type rivet feeding mechanism comprises:

a rivet box configured for providing rivets to a riveter head, one end of the rivet box being provided with a rivet feeding mechanism;

a magazine configured for storing rivets from the rivet box, and comprising a magazine cover plate arranged at a feeding end and a first air inlet communicating with a cavity of the magazine, where the rivet feeding mechanism is detachably connected with an outer side of the magazine cover plate;

a first connecting tube communicating with a discharge port of the magazine;

a rivet pulling mechanism comprising a rivet pulling block, a rivet pulling block guiding housing and a linear driving unit connected with the rivet pulling block, wherein a feeding port of the rivet pulling block guiding housing is communicating with the first connecting tube, a discharging port of the rivet pulling block guiding housing is connected with a second connecting tube, the rivet pulling block is defined with a T-shaped through hole capable of accommodating a rivet and is configured for transferring the rivet from the first connecting tube to the second connecting tube;

a blowing mechanism comprising a curved connecting tube and a third air inlet defined on the curved connecting tube, where an upper end of the curved connecting tube is connected with the second connecting tube, a lower end of the curved connecting tube is horizontally arranged and fixedly connected with the riveter head of the flow drill screwing device, and the third air inlet is arranged on the lower end of the curved connecting tube and is configured for pushing the rivet to the riveter head;

where the rivet pulling block guiding housing is defined with a second air inlet opposite to the second connecting tube; the first air inlet is configured for compressed air to enter the first connecting tube to push the rivet to move towards the rivet pulling mechanism and the second air inlet is configured for compressed air to enter the second connecting tube to push the rivet to move towards the riveter head.

Further, the first connecting tube is provided with a first position sensor, and the first position sensor is communicating with the rivet feeding mechanism for signal transmitting and receiving.

Further, the first position sensor is movable on the first connecting tube and configured for controlling a quantity of rivets stored in the magazine and the first connecting tube.

Further, the first connecting tube, the second connecting tube and the curved connecting tube are T-shaped tubes, and the T-shaped tubes are defined with a T-shaped hole matched with the rivet.

Further, an outlet of the curved connecting tube is extended in a horizontal direction, and a direction of a T-shaped hole of the curved connecting tube causes a rivet tip of the rivet to face downwards and a rivet cap of the rivet to face upwards.

Further, a curved portion of the curved connecting tube is made of a metal material, and a bending diameter of the curved portion is greater than 300 mm.

Further, the lower end of the curved connecting tube is further provided with a second position sensor, and a control unit of the third air inlet and a control unit of the linear driving unit are respectively in signal connection with the second position sensor.

Further, compressed air is continuously introduced via the first air inlet, and a pressure of the compressed air is controlled between 2 bar and 4 bar.

Further, the linear driving unit comprises a cylinder and a cylinder connecting rod connected to the cylinder.

Further, a control unit f the second air inlet is in signal connection with a position sensor on the linear driving unit.

Compared with the related art, the present application has the following beneficial effects:

according to the cartridge-type rivet supplying, the magazine is arranged on the riveter gun, and the rivet feeding hose connected with the rivet box does not move with the device, so that the problem of rivet stucking during the movement of the reverter body is avoided. The rivet can be conveyed to the riveter head only using a small amount of compressed air or under the gravity of the rivet, so that the problem of insufficient riveting airflow is avoided. Meanwhile, the magazine is installed on the top of the riveter, a U-shaped design is adopted, the occupied space of the magazine is reduced. The magazine is supplied with rivets at the preparation time of ready for the welding, such as manual loading, the tool clamping and the like, the riveting time is greatly reduced, and the production efficiency is improved.

In addition to the objectives, features, and advantages described above, there are other objectives, features and advantages of the present application. The present application will be described in further detail below with reference to the drawings.

BRIEF DESCRIPTION OF THE DRAWINGS

The drawings, which form a part of the present application, are used for a further understanding of the present application, and the illustrative embodiments of the present application and the description thereof are used to explain the present application, and do not constitute an improper limitation to the present application. In the drawings.

DETAILED DESCRIPTION OF THE EMBODIMENTS

Figure 1:
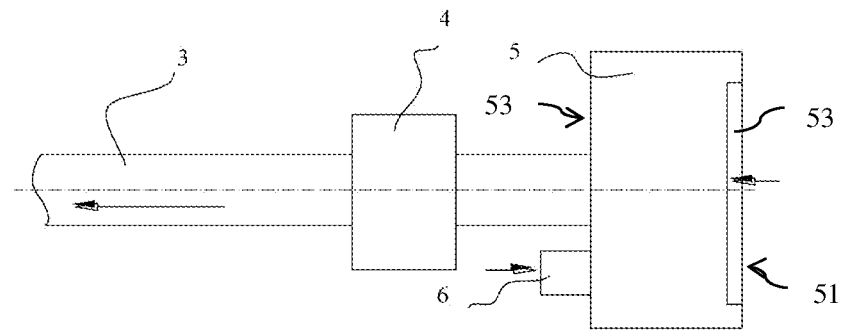
FIG. 1 is a structural schematic diagram of a magazine of a cartridge-type rivet feeding mechanism of a flow drill screwing device according to an embodiment of the present application.

It should be noted that, in the case of no conflict, the embodiments in the present application can be combined with each other and the features in the embodiments can be combined with each other. The present application will be described in detail below with reference to the accompanying drawings and in combination with embodiments.

FIGS. 1-6 show some embodiments of the present application.

As shown in FIG. 1 to FIG. 4 and FIG. 7, a cartridge-type rivet feeding mechanism 40 of a flow drill screwing device 30 includes a magazine 5, a plurality of T-shaped tubes 1, a rivet pulling mechanism 24, a blowing mechanism 25 and a plurality of position sensors. The magazine 5 is mounted on the top of a riveter head 26 of the flow drill screwing device 40. One end of the magazine 5 is connected with a rivet box 23 on a side of the flow drill screwing device 40 and configured for feeding rivets 2 to the magazine 5. Another end of the magazine 5 is connected with the rivet pulling mechanism 24 through a T-shaped tube 1. The rivet pulling mechanism 24 transports the rivets 2 to a blowing mechanism 25 one by one. The rivets 2 are blown into an outlet of a riveter by compressed air and riveted to a steel plate by the riveter.

Specifically, the magazine 5 is provided with a magazine cover plate 52 and a first air inlet 6. A feeding port 51 of the magazine 5 is detachably connected with a rivet feeding mechanism 27, and the rivet feeding mechanism 27 is connected to the rivet box 23 far way through a T-shaped tube 1. A discharge port 53 of the magazine 5 is connected with a first connecting tube 3 through a T-shaped tube connector, and the rivets 2 in the rivet box 23 are pushed by compressed air in the rivet feeding mechanism 27 and moved into the magazine 5 along the T-shaped tube 1, so as to realize rivet supplementing of the magazine 5.

Figure 8:
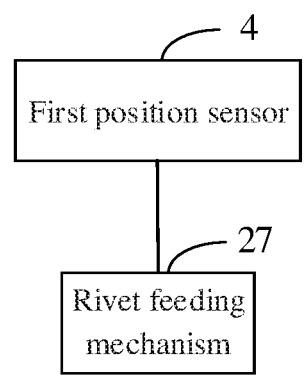
FIG. 8 is a schematic diagram showing a communication connection between a first position sensor and the rivet feeding mechanism in the cartridge-type rivet feeding mechanism of the flow drill screwing device according to an embodiment of the present application.

As shown in FIG. 1 and FIG. 8, the rivets 2 fed into the magazine 5 can also enter the first connecting tube 3 connected to a discharge port 53 of the magazine 5. The first connecting tube 3 is provided with a first position sensor 4. When the rivets 2 reaches the first position sensor 4, the first position sensor 4 produces a signal, the rivet feeding mechanism 27 on the rivet box stops feeding the rivets 2, and the magazine cover plate 52 is closed.

After the rivet supplementing to the magazine 5 is finished, the magazine cover plate 52 is closed, then the compressed air is continuously blown to the magazine 5 through the first air inlet 6, the rivets 2 in the magazine 5 are transported to the rivet pulling mechanism 24 through the first connecting tube 3, and the rivets 2 in the first connecting tube 3 are tightly attached to an end close to the rivet pulling mechanism 24. The first air inlet 6 is always opened, and at the same time, in order to prevent rivet stacking due to too large airflow and difficulty in feeding rivets 2 to the magazine 5, the pressure of the compressed air at the first air inlet 6 needs to be controlled to be between 2 and 4 bar, and not exceed 4 bar.

In some embodiments, the first position sensor 4 located on a surface of the first connecting tube 3 can move along the first connecting tube 3. By adjusting the position of the first position sensor 4, the number of the rivets 2 in the magazine 5 and the number of the rivets 2 in the first connecting tube 3 can be adjusted.

Figure 4:
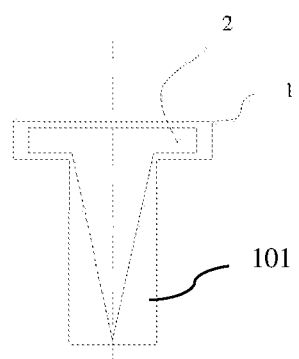
FIG. 4 is a cross-sectional view of a T-shaped tube of the cartridge-type rivet feeding mechanism of the flow drill screwing device according to an embodiment of the present application.

Specifically, the T-shaped tube 1 is a metal tube having a cross section with a T-shaped hole 101. The cross section of the T-shaped tube 1 is shown in FIG. 4. A rivet 2 can just be placed in the T-shaped tube 1, and will not be inclined or not in position. It can be seen from the cross section that gaps are reserved on two sides of a top end of the T-shaped tube 1, so that the rivet 2 is prevented from being pressed by reversed airflow in the blowing process, and on the other hand, the compressed air flows at the two sides during blowing, so that the risk that the rivets 2 contact the inner wall of the T-shaped tube 1 is reduced, and the situation that the rivets 2 are stuck in the T-shaped tube 1 is prevented. An empty space is reserved at the bottom of the T-shaped tube 1 for the same purposes.

Figure 2:
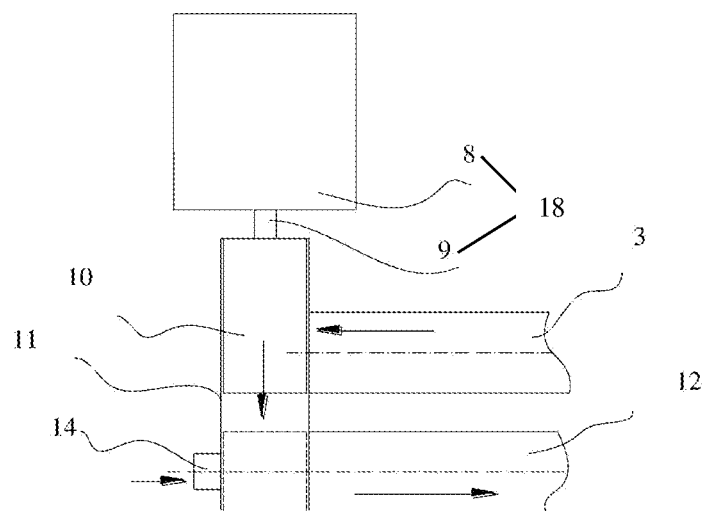
FIG. 2 is a structural schematic diagram of a rivet pulling mechanism of the cartridge-type rivet feeding mechanism of the flow drill screwing device according to an embodiment of the present application.
Figure 5:
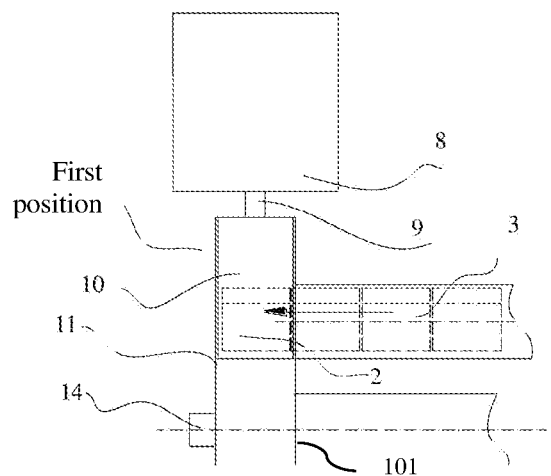
FIG. 5 is a diagram showing a first working state of the rivet pulling mechanism of the cartridge-type rivet feeding mechanism of the flow drill screwing device according to an embodiment of the present application.
Figure 6:
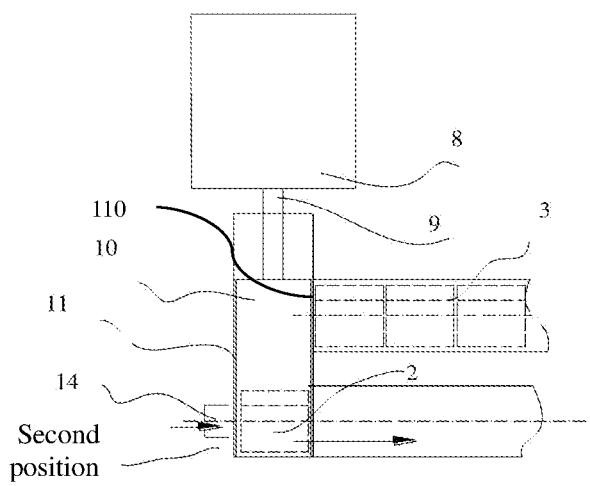
FIG. 6 is a diagram showing a second working state of the rivet pulling mechanism of the cartridge-type rivet feeding mechanism of the flow drill screwing device according to an embodiment of the present application.
Figure 7:
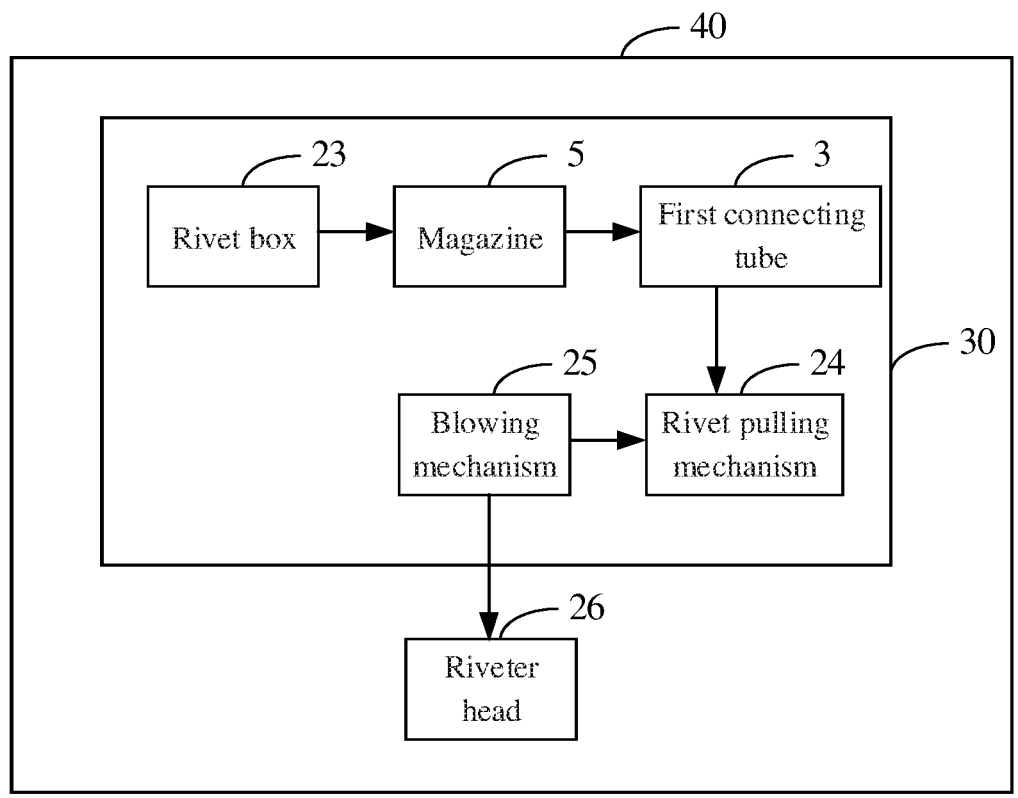
FIG. 7 is a schematic diagram of functional modules of the flow drill tightening device according to an embodiment of the present application.

Specifically, as shown in FIGS. 2, 5 and 6, the rivet pulling mechanism 24 includes a linear driving unit 18 consisting of a cylinder 8 and a cylinder connecting rod 9, a rivet pulling block 10, and a rivet pulling block guiding housing 11. The rivet pulling block 10 is located inside the rivet pulling block guiding housing 11. An inlet 110 of the rivet pulling block guiding housing 11 is connected with the magazine 5 through the first connecting tube 3. The rivets 2 in the first connecting tube 3 enters the rivet pulling block 10 under the pressure of the compressed air. The cross section of the rivet pulling block 10 is the same as the cross section of the T-shaped tube 1. The rivet pulling block 10 is defined with a T-shaped through hole matched with the rivets 2, and the rivet pulling block 10 is just enough for receiving one rivet 2.

Figure 10:
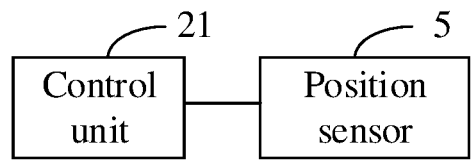
FIG. 10 is a schematic diagram showing a communication connection between a position sensor and a control unit in the present application.

An upper end of the rivet pulling block 10 is of a solid structure, and the rivet pulling block 10 is directly connected to the cylinder 8 through the cylinder connecting rod 9. When there is no rivet 2, the cylinder 8 is in a retracted state, and the rivet pulling block 10 is moved to a first position as shown in FIG. 5. When a rivet feeding instruction is given, the cylinder 8 acts to drive the rivet pulling block 10 to move downwards to reach a second position, as shown in FIG. 6. As shown in FIG. 10, when the rivet pulling block 10 reaches the second position, a position sensor 22 mounted on the cylinder 8 transmits an in-place signal to a control unit 21, and the control unit 21 controls a second air inlet 14 to input the compressed air, so that the rivet 2 is blown out of the rivet pulling block 10 and enters a second connecting tube 12 connected at an outlet 111 of the rivet pulling block guiding housing 11.

In some embodiments, as shown in FIG. 2, the rivet pulling block 10 should be long enough, so that when the rivet pulling block 10 is moved to the second position, the upper half portion of the rivet pulling block 10 can block the rivets 2 in the first connecting tube 3 to enter the rivet pulling mechanism 24, and the roughness of a right surface of the rivet pulling block 10 should be small enough to prevent the risk of clamping the rivet 2.

Figure 3:
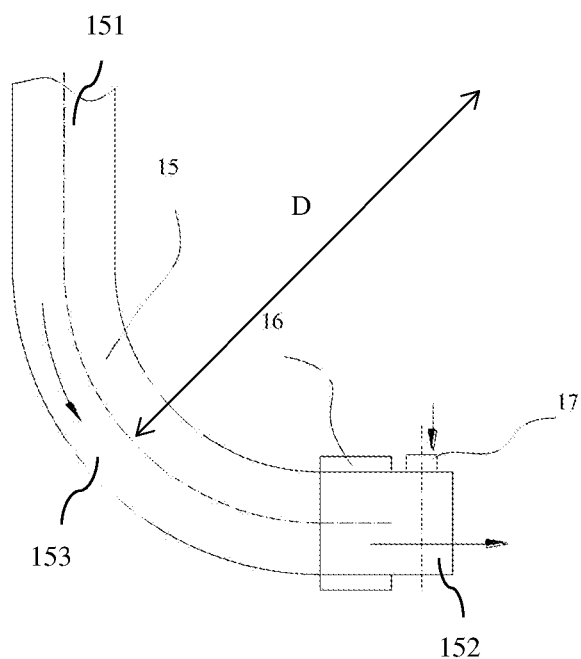
FIG. 3 is a structural schematic diagram of a blowing mechanism of the cartridge-type rivet feeding mechanism of the flow drill screwing device according to an embodiment of the present application.

Specifically, as shown in FIG. 3, the rivet 2 separated by the rivet pulling mechanism enters the blowing mechanism. The blowing mechanism includes a curved connecting tube 15, a second position sensor 16, and a third air inlet 17 defined on an upper side of a lower end of the curved connecting tube 15. The second connecting tube 12 on the rivet pulling mechanism 24 is connected to an upper end 151 of the curved connecting tube 15 through the T-shaped tube connector, and an extending direction of the lower end of the second connecting tube 12 is consistent with an extending direction of an outlet of the curved connecting tube 15, so that when the rivet 2 enters and exits the curved connecting tube 15, the rivet tip faces downwards and the rivet cap faces upwards.

Under the action of the compressed air introduced by the second air inlet 14, the rivet 2 enters the curved connecting tube 15 of the blowing mechanism 25, at this moment, the rivet tip faces upwards and the rivet cap faces upwards and enters a feeding rivet hose at the riveter head 26. After the second position sensor 16 senses that the rivet 2 passes, the compressed air enters through the third air inlet 17, so that the rivet 2 is speeded up and enters the riveter head 26, after the rivet 2 is fed into the riveter head 26, the compressed air is no longer blown; and meanwhile, referring to FIG. 9, after a control unit 20 of the cylinder 8 receives the signal sent by the second position sensor 16, the rivet pulling block 10 is pulled back to the first position, and the rivet pulling block 10 will be pulled back to the second position after the riveting is completed.

In the embodiment, in the actual use process of the flow drill screwing device 40, the riveter head 26 of the flow drill screwing device 40 moves up and down relative to the device body, meanwhile, the magazine 5 configured for temporarily storing rivets 2, and the rivet pulling mechanism 24 are movable related to the flow drill screwing device 40, the lower end 152 of the curved connecting tube 15 is horizontally arranged and fixed relative to the riveter head 26, when the curved connecting tube 15 is used, it can be guaranteed that the rivet tip is always facing downwards and the rivet cap is always facing upwards before the rivet 2 enters the riveter head 26, and will not change following the position change of the magazine 5 and the rivet pulling mechanism 24.

In some embodiments, as shown in FIG. 3, a curved portion 153 of the curved connecting tube 15 is made of a metal material, and a bending diameter D of the curved portion 153 needs to be greater than 300 mm. In this regard, it is ensured that the curved connecting tube 15 is not prone to wear, especially when the rivets 2 pass through the curved portion 153 at a high speed, a centrifugal force is generated, if a plastic tube is used, burrs are easy to generate and result in that the rivets 2 are stuck. The roughness of the inner surface of the metal needs to be small enough. On the other hand, the bending diameter D of the curved portion needs to be large enough, so that when the rivets 2 pass through the curved portion 153, the situation that the rivets 2 are stuck due to the fact that the rivet cap cannot pass through will not occurs. At the same time, both ends of all the T-shaped tubes 1 adopt metal piece joints, so as to prevent burrs frog being generated due to the frequent passing of rivets 2 and rivets 2 are stuck.

The working process of the cartridge-type rivet feeding mechanism of the flow drill tightening device is as follow:

before the riveting, the riveter is moved to a rivet feeding position located on one side of the rivet box 23 through a mechanical arm, then the compressed air is used to convey the rivets 2 from the rivet box 23 to the rivet feeding mechanism 27 through the rivet feeding hose, at this moment the magazine cover plate 52 is opened, and the rivets 2 can directly enter the magazine 5, after the first position sensor 4 detects that the supplementing of the rivet 2 to the magazine 5 and to the first connecting tube 3 is completed, the magazine cover plate 53 is closed.

Then, the compressed air is continuously blown to the magazine 5 through the first air inlet 6, the rivets 2 in the magazine 5 are conveyed into the rivet pulling block 10 of the rivet pulling mechanism 24 through the first connecting tube 3, and the position of the rivet pulling block 10 changes under the action of the cylinder 8, so that the rivets 2 are fed into the curved connecting tube 15 of the blowing mechanism 25 one by one.

Figure 9:
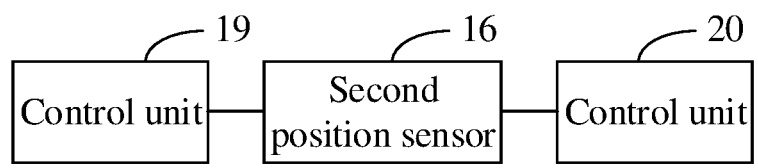
FIG. 9 is a schematic diagram showing a communication connection between a second position sensor and control units in the cartridge-type rivet feeding mechanism of the flow drill screwing device according to an embodiment of the present application.

Finally, referring to FIG. 9, after a rivet 2 passes through the second position sensor 16, a control unit 19 of the third air inlet 17 receives the signal of the second position sensor 16, and feeds the compressed air through the third air inlet 17, and the rivet 2 is pushed to ivet feeding hose at the riveter head 26 to reach a riveter nozzle, so that the riveter head 26 executes a riveting instruction for riveting. After the riveting is completed, the magazine 5 sends another rivet 2 to the riveter head 26, after the second position sensor 16 of the blowing mechanism 25 detects the rivet 2, the cylinder 8 receives a signal transmitted by the second position sensor 16, drives the rivet pulling block 10 to return to the first position, and waits for the rivet pulling block 10 to enter the next cycle after the riveting is completed.

The above are only preferred embodiments of the present application and are not intended to limit the present application. For those skilled in the art, the present application may have various modifications and variations. Any modification, equivalent replacement, improvement or the like made within the spirit and principle of the present application shall fall within the claimed scope of the present application.

What is claimed is:

1. A cartridge-type rivet feeding mechanism of a flow drill screwing device comprising:
   a rivet box configured for providing rivets to a riveter head;
   a magazine configured for storing rivets from the rivet box, and comprising a magazine cover plate arranged at a feeding end and a first air inlet communicating with the magazine, wherein a rivet feeding mechanism is detachably connected with an outer side of the magazine cover plate;
   a first connecting tube communicating with a discharge port of the magazine;
   a rivet pulling mechanism comprising a rivet pulling block, a rivet pulling block guiding housing and a linear driving unit connected with the rivet pulling block, wherein an inlet of the rivet pulling block guiding housing is communicating with the first connecting tube, an outlet of the rivet pulling block guiding housing is connected with a second connecting tube, the rivet pulling block is capable of accommodating a rivet and is configured for transferring the rivet from the first connecting tube to the second connecting tube; and
   a blowing mechanism comprising a curved connecting tube and a third air inlet defined on the curved connecting tube, wherein an upper end of the curved connecting tube is connected with the second connecting tube, a lower end of the curved connecting tube is horizontally arranged and fixedly connected with the riveter head of the flow drill screwing device, and the third air inlet is arranged on the lower end of the curved connecting tube and is configured for pushing the rivet to the riveter head;
   wherein, the rivet pulling block guiding housing is defined with a second air inlet opposite to the second connecting tube; the first air inlet is configured for compressed air to enter the first connecting tube to push the rivet to move towards the rivet pulling mechanism and the second air inlet is configured for compressed air to enter the second connecting tube to push the rivet to move towards the riveter head.

2. The cartridge-type rivet feeding mechanism of the flow drill screwing device according to claim 1, wherein the first connecting tube is provided with a first position sensor, and the first position sensor is communicating with the rivet feeding mechanism for signal transmitting and receiving.

3. The cartridge-type rivet feeding mechanism of the flow drill screwing device according to claim 2, wherein the first position sensor is movable on the first connecting tube and configured for controlling a quantity of rivets stored in the magazine and the first connecting tube.

4. The cartridge-type rivet feeding mechanism of the flow drill screwing device according to claim 1, wherein the first connecting tube, the second connecting tube and the curved connecting tube are T-shaped tubes, and the T-shaped tubes are defined with a T-shaped hole matched with the rivet.

5. The cartridge-type rivet feeding mechanism of the flow drill screwing device according to claim 4, wherein the lower end of the curved connecting tube is extended in a horizontal direction, and a direction of a T-shaped hole of the curved connecting tube causes a rivet tip of the rivet to face downwards and a rivet cap of the rivet to face upwards.

6. The cartridge-type rivet feeding mechanism of the flow drill screwing device according to claim 1, wherein a curved portion of the curved connecting tube is made of a metal material, and a bending diameter of the curved portion is greater than 300 mm.

7. The cartridge-type rivet feeding mechanism of the flow drill screwing device according to claim 1, wherein the lower end of the curved connecting tube is further provided with a second position sensor, and a control unit of the third air inlet and a control unit of the linear driving unit are respectively in signal connection with the second position sensor.

8. The cartridge-type rivet feeding mechanism of the flow drill screwing device according to claim 1, wherein the compressed air is continuously introduced via the first air inlet, and a pressure of the compressed air is controlled between 2 bar and 4 bar.

9. The cartridge-type rivet feeding mechanism of the flow drill screwing device according to claim 1, wherein the linear driving unit comprises a cylinder and a cylinder connecting rod connected to the cylinder.

10. The cartridge-type rivet feeding mechanism of the flow drill screwing device according to claim 1, wherein a control unit of the second air inlet is in signal connection with a position sensor on the linear driving unit.

* * * * *